United States Patent
Williams

(10) Patent No.: US 7,617,906 B2
(45) Date of Patent: Nov. 17, 2009

(54) HYDRAULIC STEERING SYSTEM WITH A VARIABLE FLOW DEVICE

(75) Inventor: Daniel E. Williams, Lebanon, IN (US)

(73) Assignee: TRW Automotive U.S. LLC, Livonia, MI (US)

(*) Notice: Subject to any disclaimer, the term of this patent is extended or adjusted under 35 U.S.C. 154(b) by 455 days.

(21) Appl. No.: 11/250,860

(22) Filed: Oct. 14, 2005

(65) Prior Publication Data

US 2007/0095598 A1    May 3, 2007

(51) Int. Cl.
B62D 5/06    (2006.01)

(52) U.S. Cl. .................................... 180/422; 180/415

(58) Field of Classification Search .............. 180/402, 180/403, 417, 422, 444, 443
See application file for complete search history.

(56) References Cited

U.S. PATENT DOCUMENTS 6,069,460 A * 5/2000 Grabowski et al. .......... 318/434
6,164,407 A   12/2000 Cheng
6,612,393 B2 * 9/2003 Bohner et al. ............... 180/405
6,736,234 B2 * 5/2004 Zheng et al. ................ 180/402
2004/0188169 A1   9/2004 Williams et al.
2004/0226769 A1 * 11/2004 Croughs et al. ............. 180/422

* cited by examiner

Primary Examiner—Tony H. Winner
(74) Attorney, Agent, or Firm—Tarolli, Sundheim, Covell & Tummino LLP

(57) ABSTRACT

An apparatus (10) for turning steerable wheels (12, 14) of a vehicle in response to turning of a steering wheel (18) of the vehicle. The apparatus includes a hydraulic power steering gear, which does not include a rotary valve responsive to a steering input generated by turning of a steering wheel (18). The hydraulic steering gear includes a first chamber (96) for holding hydraulic fluid and a second chamber (98) for holding hydraulic fluid. An increase in fluid pressure in one chamber acts to turn the steerable wheels (12, 14) of the vehicle in one direction and an increase in fluid pressure in the other chamber acts to turn the steerable wheels (12, 14) in a direction opposite the one direction. The apparatus (10) includes a variable flow mechanism (50) for supplying a flow of hydraulic fluid to the first and second chambers (96, 98), which flow varies in dependence upon at least one sensed vehicle condition.

20 Claims, 3 Drawing Sheets

HYDRAULIC STEERING SYSTEM WITH A VARIABLE FLOW DEVICE

TECHNICAL FIELD

The present invention relates to an apparatus for turning steerable wheels of a vehicle in response to turning of a steering wheel of the vehicle, and in particular relates to a hydraulic steering system.

BACKGROUND OF THE INVENTION

A conventional hydraulic power steering system includes a steering gear having a hydraulic motor. A fluid pump draws hydraulic fluid from a fluid reservoir and supplies the hydraulic fluid to the steering gear. Typically, the engine of the vehicle powers the pump to supply hydraulic fluid from the fluid reservoir to the steering gear. The steering gear includes a rotary control valve, which has a relatively rotatable valve core and valve sleeve. The rotary control valve directs hydraulic fluid to the hydraulic motor in response to steering inputs generated by turning of the steering wheel. The hydraulic motor is operatively connected to the steerable wheels of the vehicle and, when actuated, helps to turn the steerable wheels.

In a typical hydraulic power steering system, hydraulic fluid is circulated between the pump, the control valve, and the fluid reservoir. For example, U.S. Patent Application Publication No. 20040188169 discloses an apparatus for helping to turn steerable wheels of a vehicle. The apparatus includes a hydraulic power steering gear having a control valve and an electric motor that actuates the control valve. A pump supplies the control valve of the steering gear with hydraulic fluid. A vehicle speed sensor senses vehicle speed and provides a vehicle speed signal. A controller is responsive to the vehicle speed signal for controlling the pump. The controller activates the pump to supply hydraulic fluid to the steering gear when the vehicle speed signal indicates a vehicle speed below a predetermined value. The controller deactivates the pump when the vehicle speed signal indicates a vehicle speed above the predetermined value.

SUMMARY OF THE INVENTION

The present invention relates to an apparatus for turning steerable wheels of a vehicle in response to turning of a steering wheel of the vehicle. The apparatus includes a first system for connection to the steering wheel to turn the steerable wheels in response to turning of the steering wheel. The apparatus further includes a hydraulic power steering gear, which is free of a rotary valve responsive to a steering input generated by turning of the steering wheel. The hydraulic steering gear includes a first chamber for holding hydraulic fluid and a second chamber for holding hydraulic fluid. An increase in fluid pressure in one chamber acts to turn the steerable wheels of the vehicle in one direction and an increase in fluid pressure in the other chamber acts to turn the steerable wheels in a direction opposite the one direction. The apparatus includes a variable flow mechanism for supplying a flow of hydraulic fluid to the first and second chambers of the hydraulic steering gear, which flow varies in dependence upon at least one sensed vehicle condition.

The present invention also relates to an apparatus for turning steerable wheels of a vehicle in response to turning of a steering wheel of the vehicle. The apparatus includes an electric motor controlled by an electronic control module for providing "feel" to the steering wheel. The apparatus further includes a hydraulic steering gear. The hydraulic steering gear includes a first chamber for holding hydraulic fluid and a second chamber for holding hydraulic fluid. An increase in fluid pressure in one chamber acts to turn the steerable wheels of the vehicle in one direction and an increase in fluid pressure in the other chamber acts to turn the steerable wheels in a direction opposite the one direction. The apparatus includes a variable flow mechanism controllable by the electronic control module for supplying a variable flow of hydraulic fluid to the first and second chambers, which flow varies in dependence upon the at least one sensed vehicle condition.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION OF THE INVENTION

Figure 1:
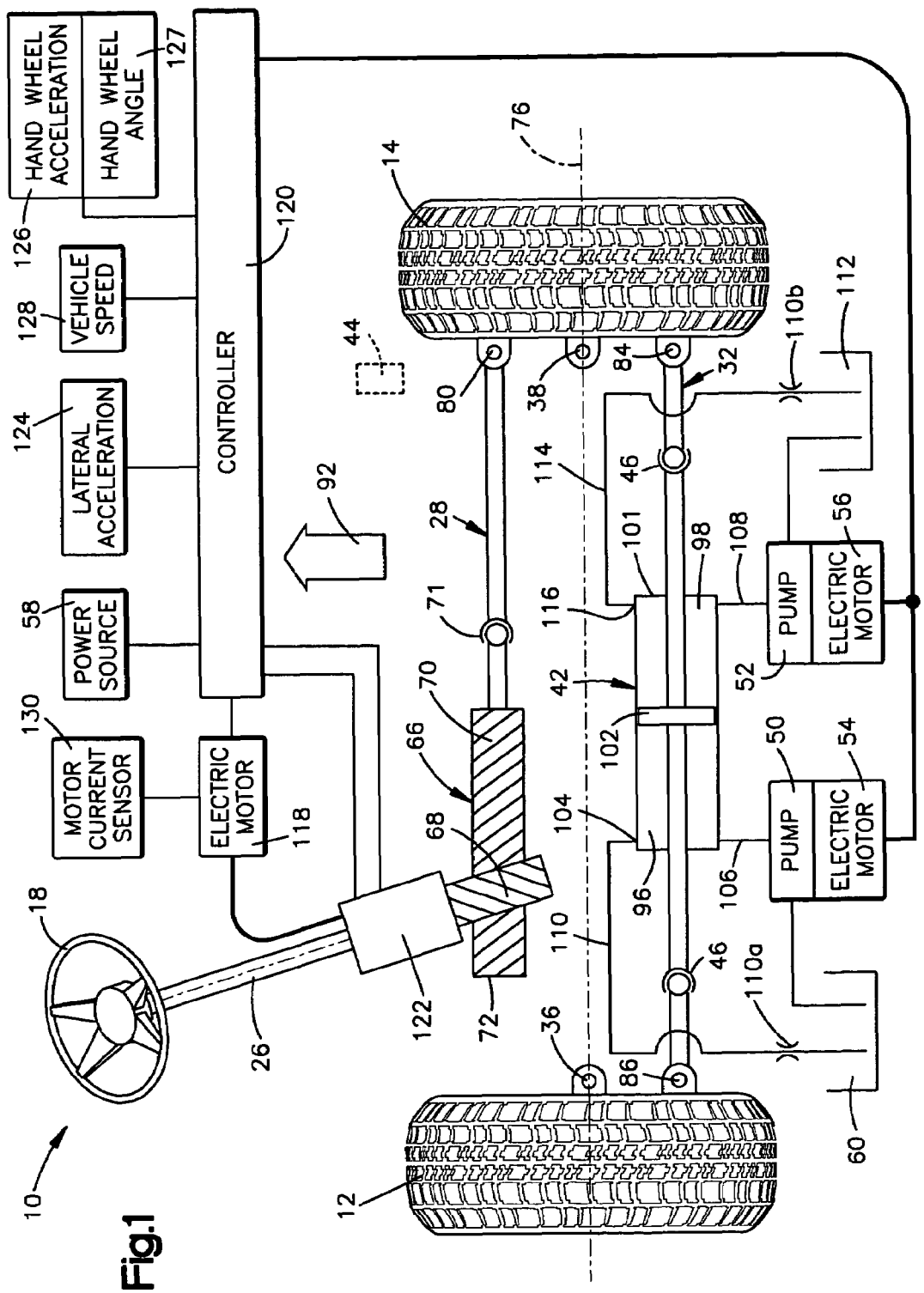
FIG. 1 is a schematic illustration of an apparatus constructed in accordance with the present invention.

FIG. 1 illustrates an apparatus 10 constructed in accordance with the present invention. The apparatus 10 turns steerable front wheels 12 and 14 of a vehicle in response to rotation of a hand wheel or steering wheel 18 of the vehicle. The manually rotatable hand wheel 18 is coupled to a rotatable input shaft 26, which rotates with the hand wheel 18.

A connector member 28 connects a rack and pinion mechanism to the steerable vehicle wheel 14. A force transmitting member or tie rod 32 extends between and is connected to the steerable vehicle wheels 12 and 14. The steerable vehicle wheels 12 and 14 are supported for turning movement about pivot connections or kingpins 36 and 38. A hydraulic power steering motor 42 is connected with a frame 44 of the vehicle and is associated with the force transmitting member 32. Pivot joints, specifically ball and socket joints 46, are provided in the force transmitting member 32.

A piston 102 is located within a chamber 101 of the power steering motor 42 and divides the chamber 101 into opposite left and right chamber portions 96 and 98. The left chamber portion 96 is located on a left side of the piston 102 and the right chamber portion 98 is located on a right side of the piston 102, as viewed in FIG. 1. The piston 102 creates a seal between the respective chamber portions 96 and 98 and is capable of axial movement within the chamber 101. This axial movement of the piston 102 results in an increase in volume of one chamber portion, e.g., 96, and a corresponding decrease in volume of the other chamber portion, e.g., 98. The decreasing chamber portion, e.g., 98, is vented to allow a portion of the fluid contained in the decreasing chamber portion to escape.

The power steering motor 42 is connected to a variable flow mechanism. The variable flow mechanism can be any suitable mechanism. In the apparatus illustrated, the variable flow mechanism comprises left and right pumps 50, 52 as illustrated in FIG. 1. The left pump 50 is fluidly connected to the left chamber portion 96 via hydraulic fluid line 106. The right pump 52 is fluidly connected to the right chamber portion 98 via hydraulic fluid line 108.

The left pump 50, when actuated, draws hydraulic fluid from a fluid reservoir 60 and supplies the hydraulic fluid to the left chamber portion 96 of the power steering motor 42. An electric motor 54 is operatively connected to drive the left pump 50. The pump motor 54 receives electric power from a power source 58. The power source 58 may be the vehicle battery or engine.

When energized, the motor 54 drives the left pump 50 to supply hydraulic fluid to the left chamber portion 96 of the power steering motor 42. A return line 110 having an orifice 110a is fluidly connected to the exit opening 104 of the left chamber portion 96 and the reservoir 60. The return line 110 directs the escaping hydraulic fluid into the reservoir 60. The orifice 110a restricts the flow of hydraulic fluid through the return line 110 to an amount that is less than that being supply by the left pump 50, so that the pressure and volume of hydraulic fluid in the left chamber portion 96 increases when the pump 50 supplies the fluid to the left chamber portion 96. A check valve could also be provided in the return line 110 to prevent possible backflow of fluid toward the pump 50. The motor 54 is a variable speed motor and may be driven at different speeds to vary the output flow rate from the left pump 50.

The right pump 52 draws hydraulic fluid from a fluid reservoir 112 and supplies the hydraulic fluid to the right chamber portion 98 of the power steering motor 42. An electric motor 56 is operatively connected to drive the right pump 52. The motor 56 receives electric power from the power source 58. When energized, the motor 56 drives the right pump 52 to supply hydraulic fluid to the right chamber portion 98. A return line 114 is fluidly connected to an exit opening 116 of the right chamber portion 98 and the reservoir 112. The return line 114 directs the escaping hydraulic fluid into the reservoir 112. The orifice 110b restricts the flow of hydraulic fluid through the return line 114 to an amount that is less than that being supplied by the right pump 52, so that the pressure and volume of hydraulic fluid in the right chamber portion 98 increases when the right pump 52 supplies the fluid to the right chamber portion 98. A check valve could be provided in the return line 114 to prevent possible backflow of fluid toward the pump 52. The motor 56 is a variable speed motor and may be driven at different speeds to vary the output flow rate from the right pump 52.

The apparatus 10 also includes an electric motor 118. The electric motor 118 is a reversible variable speed motor in that it may be driven at different speeds and in opposite directions. The electric motor 118 may be of any conventional design. The electric motor 118 receives electric power from the power source 58. An output (not shown) of the electric motor 118 is connected to the input shaft 26. When the electric motor 118 receives electric power, the output shaft of the electric motor 118 provides a force to the input shaft 26 to provide a steering "feel" to the vehicle operator. This force tends to bias (or drive) the input shaft 26 opposite its direction of turning by the vehicle operator.

A pinion gear 68 is coupled to the input shaft 26 and rotates with the input shaft 26. The pinion gear 68 is disposed in meshing engagement with a rack 66. A right end portion 70, as viewed in FIG. 1, of the rack 66 is connected with the connector member 28 and steerable vehicle wheel 14 by a ball and socket pivot joint 71. The opposite or left end portion 72 of the rack 66 is not connected to the steerable vehicle wheel 12. Alternatively, a worm wheel and worm gear could be used instead of the pinion gear 68 and rack 66.

The connector member 28, which is connected to the left end portion 70 of the rack 66 and the steerable wheel 14, has a central axis which extends parallel to the central axis of the force transmitting member 32 when the steerable vehicle wheels 12 and 14 are in the straight ahead orientation of FIG. 1. The connector member 28 and force transmitting member 32 both extend parallel to a horizontal axis 76 through the pivot connections 36 and 38 for the steerable wheels 12 and 14 when the steerable vehicle wheels 12 and 14 are in the straight ahead orientation.

Upon operation of the steering apparatus 10, the steerable vehicle wheels 12 and 14 are pivoted about vertical axes which extend perpendicular to and intersect the axis 76. As this occurs, the right end portion 70 of the connector member 28 pivots about a vertical axis extending through a pivot connection 80 between the connector member 28 and the steerable vehicle wheel 14. At the same time, opposite end portions of the force transmitting member 32 pivot about vertical axes extending through pivot connections 84 and 86, which connect opposite ends of the force transmitting member 32 to the steerable vehicle wheels 12 and 14.

When the vehicle with the steerable wheels 12 and 14 is proceeding in a straight ahead direction, that is, in the direction of arrow 92 in FIG. 1, rotation of the steering wheel 18 in one direction results in actuation of at least one of the pumps 50, 52. Actuation of one of the pumps results in relatively high fluid pressure in one of the left chamber portion 96 and the right chamber portion 98 of the power steering motor 42.

The relatively high fluid pressure in the high pressure chamber portion, for example, the left chamber portion 96 of the steering motor 42, is applied against the piston 102 which is connected to the force transmitting member 32. This increase in fluid pressure in the left chamber portion 96 acts to turn the steerable wheels 12 and 14 of the vehicle in a counterclockwise direction as shown in FIG. 1, about the pivot connections 36 and 38. As the vehicle wheels 12 and 14 are turned, the rack 66 moves toward the left (as viewed in FIG. 2) and rotates the pinion gear 68 in a follow-up manner as is known to those skilled in the art. A similar operation occurs if the chamber 98 receives the relatively high pressure.

The apparatus 10 includes an electronic controller 120, which is electrically coupled to the pumps 50, 52. The controller 120 controls the flow of hydraulic fluid from the pumps by controlling the speed of the pumps 50, 52 in order to generate the proper steering force. The apparatus 10 also includes a plurality of vehicle condition sensors 122, 124, 126, 127, and 128. Preferably, the vehicle condition sensors include a column torque sensor 122, a lateral acceleration sensor 124, a hand wheel acceleration sensor 126 and a hand wheel angle sensor 127, and a vehicle speed sensor 128. Each of the sensors 122, 124, 126, 127, and 128 is electrically connected to the controller 120.

The column torque sensor 122 encircles the input shaft 26 and senses column torque and outputs a signal indicative of the column torque. The column torque sensor may include a torsion bar between shaft parts and a sensor for sensing relative rotation of the shaft parts. The lateral acceleration sensor 124 senses the lateral acceleration of the vehicle and generates an electrical signal indicative of the sensed lateral acceleration of the vehicle. The hand wheel acceleration sensor 126 and hand wheel angle sensor 127 (which may be the sensor for sensing relative rotation of the shaft parts) senses the magnitude, rate, and acceleration of rotation of the vehicle hand wheel 18 and generates electrical signals indicative of these parameters. The hand wheel rotation magnitude is the angle of rotation of the hand wheel 18 relative to a straight ahead position of the hand wheel.

Rotation of the hand wheel 18 in a first direction may be designated as a positive value and rotation of the hand wheel 18 in a second direction, opposite the first direction, may be designated as a negative value. The hand wheel acceleration sensor 126 and hand wheel angle sensor 127, or the controller 120, may determine the rate of rotation of the hand wheel 18 by taking a time differential of the magnitude and may determine the hand wheel acceleration by taking a time differential of the velocity of rotation. The vehicle speed sensor 128 senses the vehicle speed and generates an electrical signal indicative of the speed.

The apparatus 10 also includes a motor current sensor 130 for sensing the actual current of the electric motor 118 and for providing a motor current signal indicative of the sensed current. The motor current sensor 130 is operatively connected to the controller 120. The controller 120 receives the motor current signal from the motor current sensor 130 and uses the motor current signal to determine the output torque of the electric motor 118.

The controller 120 receives the signals generated by the torque sensor 122, lateral acceleration sensor 124, the hand wheel acceleration sensor 126 and a hand wheel angle sensor 127, and the vehicle speed sensor 128. The controller 120 analyzes the respective signals and generates a control signal for controlling the electric motor 118. Thus, the electric motor 118 is controlled by the controller to provide the steering "feel" to the hand wheel 18. Simultaneous with actuation of the electric motor 118, the hydraulic motor 42 is energized to turn the steerable wheels 12, 14.

The controller 120 also compares the signals from the sensors to stored reference values. The reference values may take the form of look-up tables stored in the memory of the controller 120. When the comparison indicates that the signals correspond to predetermined stored reference values, the controller 104 outputs a control signal to the motor of one of the pumps 50, 52.

When the hand wheel 18 starts to rotate to turn the wheels 12, 14 to the right or in a clockwise direction, as viewed from FIG. 1, the hand wheel angle sensor 127 senses this direction of rotation, which signal is communicated and generates an electrical signal indicative of the direction of rotation to the controller 120. The controller 120 analyzes this signal along with the other signals the controller receives 120 and sends a first control signal to the pump motor 56, which causes the right pump 56 to supply a flow of hydraulic fluid to the right chamber portion 98 of the power steering motor 42.

Figure 2:
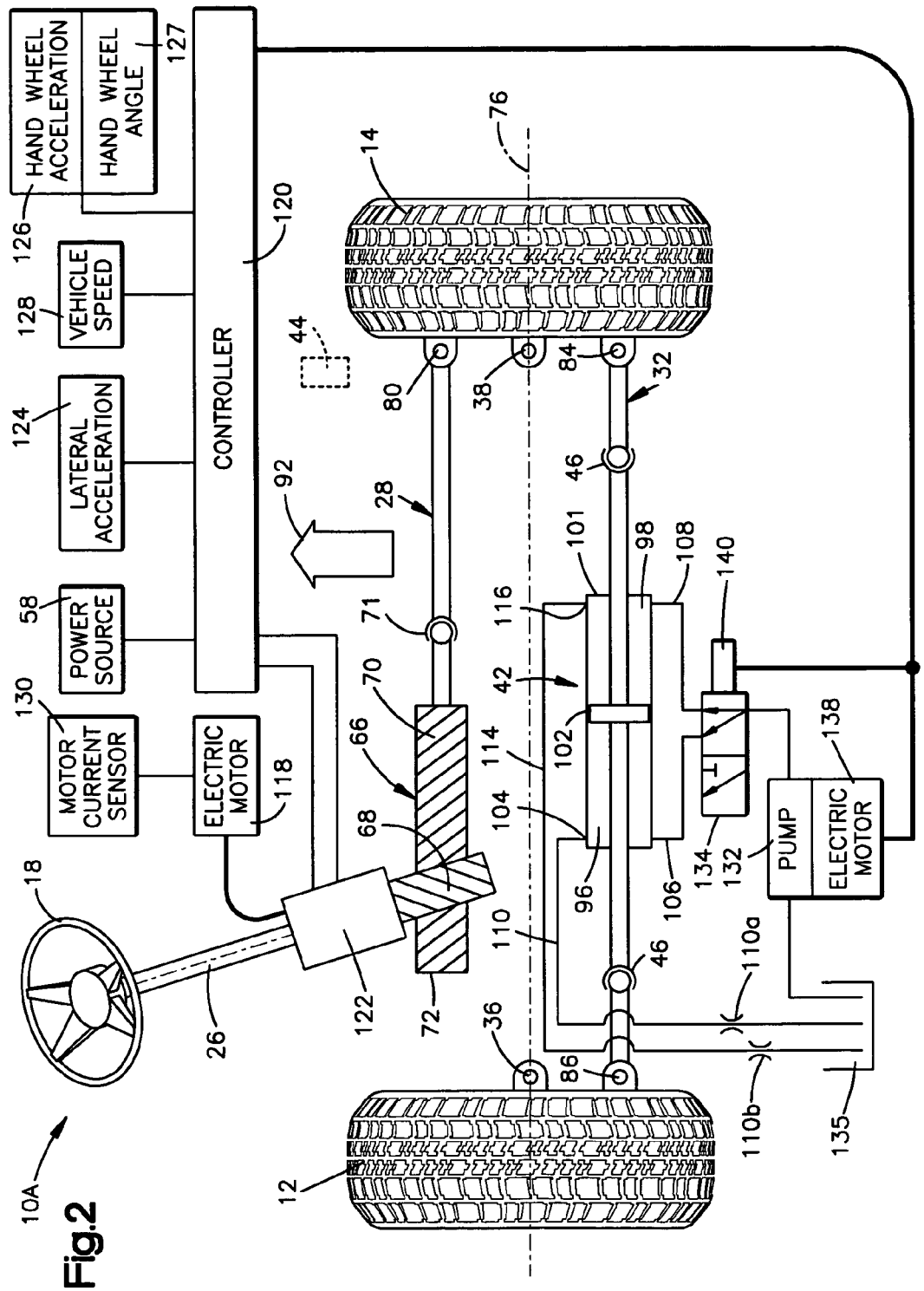
FIG. 2 is a schematic illustration of an apparatus constructed in accordance with a second embodiment of the present invention.

When the hand wheel 18 starts to rotate to turn the wheels 12, 14 in the left or counterclockwise direction, as viewed from FIG. 2, the hand wheel angle sensor 127 senses this direction and generates an electrical signal indicative of the direction of rotation to the controller 120. The controller 120 analyzes this signal and sends a second control signal to the pump motor 54, which causes the left pump 50 to supply a flow of hydraulic fluid to the left chamber portion 96 of the power steering motor 42. In either direction of rotation, the first or second control signal causes the pump motor of the actuated pump to supply the proper amount of flow of hydraulic fluid to the corresponding chamber portion.

For example, when the steerable wheels 12, 14 of the vehicle are to turn clockwise at a vehicle speed of twenty kilometers per hour, the controller 120 sends a control signal to the motor 56. The motor 56 controls the right pump 52 to supply a first flow of hydraulic fluid to the right chamber portion 98 to counteract the turning resistance of the steerable wheels 12, 14 at that speed. When the vehicle is stationary, the turning resistance of the steerable wheels 12, 14 is greater than that when the vehicle is moving. Therefore, the controller 120 sends a control signal to the motor 56 to control the right pump 52 to supply a second flow of hydraulic fluid to the right chamber portion 98 that is greater than the first flow of hydraulic fluid in order to counteract the larger turning resistance of the steerable wheels 12, 14.

In operation, when the user starts to rotate the hand wheel 18 counterclockwise to turn the steerable wheels 12, 14 in the counterclockwise direction, the controller 120 sends a control signal to the electric motor 118 to provide operator "feel".

The controller 120 also sends a control signal, based on the signals received by the sensors 122, 124, 126, 127, and 128, to the motor 54 of the left pump 50. The motor 54 actuates the left pump 50 to supply a flow of hydraulic fluid to the left chamber portion 96. The amount of flow depends upon the sensed vehicle conditions. The flow to the left chamber portion 96 increases the volume and pressure in the left chamber portion 96 and thereby moves the piston 102 to the right. This movement of the piston 102 causes the force transmitting member 32 to pivot about pivot connections 84, 86 and assist in the turning of the wheels 12, 14 to the left. Thus, the hydraulic steering motor 42 turns the steerable wheels 12, 14. As the steerable wheels 12, 14 are turned to the left, the rack 66 moves toward the left in a follow-up manner and tends to return the sensors, including the torque sensor 122 to a neutral position.

When the user starts to rotate the hand wheel 18 clockwise to turn the steerable wheels 12, 14 in the clockwise direction, the controller 120 sends a control signal to the electric motor 118 to provide operator "feel".

The controller 120 also sends a control signal, based on the signals received by the sensors 122, 124, 126, 127, and 128, to the motor 56 of the right pump 52. The motor 56 actuates the right pump 52 to supply a flow of hydraulic fluid to the right chamber portion 98. The amount of flow depends upon the sensed vehicle conditions. The flow to the right chamber portion 98 increases the volume and pressure in the right chamber portion 98 and thereby moves the piston 102 to the left, as viewed in FIG. 1. This movement of the piston 102 causes the force transmitting member 32 to pivot about pivot connections 84, 86 and assist in the turning of the wheels 12, 14 to the right. Thus, the hydraulic steering motor 42 turns the steerable wheels 12, 14. As the steerable wheels 12, 14 are turned to the right (clockwise), the rack 66 moves toward the right in a follow-up manner and tends to return the sensors, including the torque sensor 122 to a neutral position.

If the hydraulic motor 42 fails to operate, turning of the steerable wheels 12, 14 can be accomplished by manual rotation of the hand wheel 18 which turns the pinion gear 68 to move the rack 66.

FIG. 2 illustrates an apparatus 10A constructed in accordance with a second embodiment of the present invention. Structures of FIG. 2 that are the same as or similar to structures of FIG. 1 are numbered using the same reference numbers and are not discussed in detail with regard to FIG. 2. Only the differences between the apparatus 10 of FIG. 1 and the apparatus 10A of FIG. 2 are discussed in detail below.

In the second embodiment, the variable flow mechanism includes only one pump 132. A two position valve 134 is connected to the pump 132 and the left and right chamber portions 96, 98. The pump 132 draws fluid from a reservoir 135. In this embodiment, both of the return lines 110, 114 are fluidly connected to the reservoir 135 to direct the escaping hydraulic fluid into the reservoir 135.

The two position valve 134 operates to place the pump 132 in fluid communication to either the right chamber portion 98 when the vehicle is turning right or the left chamber portion 96 when the vehicle is turning left. In particular, the electronic controller 120 is electrically coupled to a motor 138 of the pump 132 and a valve drive 140. The valve drive 140 is connected to the two position valve 134 for actuating the valve 134 between the first and second positions. The valve drive 140 is preferably a solenoid. The controller 120 controls actuation of the valve drive 140 to place the valve 134 in either the first position or second position.

In operation, when a user starts to rotate the hand wheel 18 to turn the steerable wheels 12, 14 in the clockwise direction, the controller 120 analyzes the signal from the hand wheel angle sensor 126 and sends a first control signal to the valve drive 140, which places the valve 134 in the first position. In the first position, the valve 134 places the pump 132 in fluid communication with the right chamber portion 98 of the power steering motor 42. The controller 120 also sends a control signal to the electric motor 118.

The controller 120 further sends a control signal. based on the signals received by the sensors 122, 124, 126, 127, and 128, to the motor 138 of the pump 132 to supply a flow of hydraulic fluid to the right chamber 98. The amount of flow depends upon the sensed vehicle conditions as previously described in the first embodiment. The flow to the right chamber portion 98 increases the volume and pressure in the right chamber portion 98 and thereby moves the piston 102 to the left. This movement of the piston 102 causes the force transmitting member 32 to pivot about pivot connections 84, 86 and assist in the turning of the wheels 12, 14 to the right. Thus, the hydraulic steering motor 42 turns the steerable wheels 12, 14. As the steerable wheels 12, 14 are turned to the right, the rack 66 moves toward the right in a follow-up manner and tends to return the sensors to a neutral position.

When the hand wheel 18 starts to rotate to turn the steerable wheels 12, 14 in the counterclockwise direction, the controller 120 analyzes the signal from the hand wheel angle sensor 126 and sends a second control signal to the valve drive 140, which places the valve 134 in the second position. In the second position, the valve 134 places the pump 132 in fluid communication with the left chamber portion 96 of the power steering motor 42. The controller 120 also sends a control signal to the electric motor 118.

The controller 120 further sends a control signal. based on the signals received by the sensors 122, 124, 126, 127, and 128, to the motor 138 of the pump 132 to supply a flow of hydraulic fluid to the left chamber 96. The amount of flow depends upon the sensed vehicle conditions as previously described in the first embodiment. The flow to the left chamber portion 96 increases the volume and pressure in the left chamber portion 96 and thereby moves the piston 102 to the right. This movement of the piston 102 causes the force transmitting member 32 to pivot about pivot connections 84, 86 and assist in the turning of the wheels 12, 14 to the left. As the steerable wheels 12, 14 are turned to the left, the rack 66 moves toward the left in a follow-up manner and tends to return the sensors to a neutral position. If the hydraulic motor 42 fails to operate, turning of the steerable wheels 12, 14 can be accomplished by manual rotation of the hand wheel 18.

Figure 3:
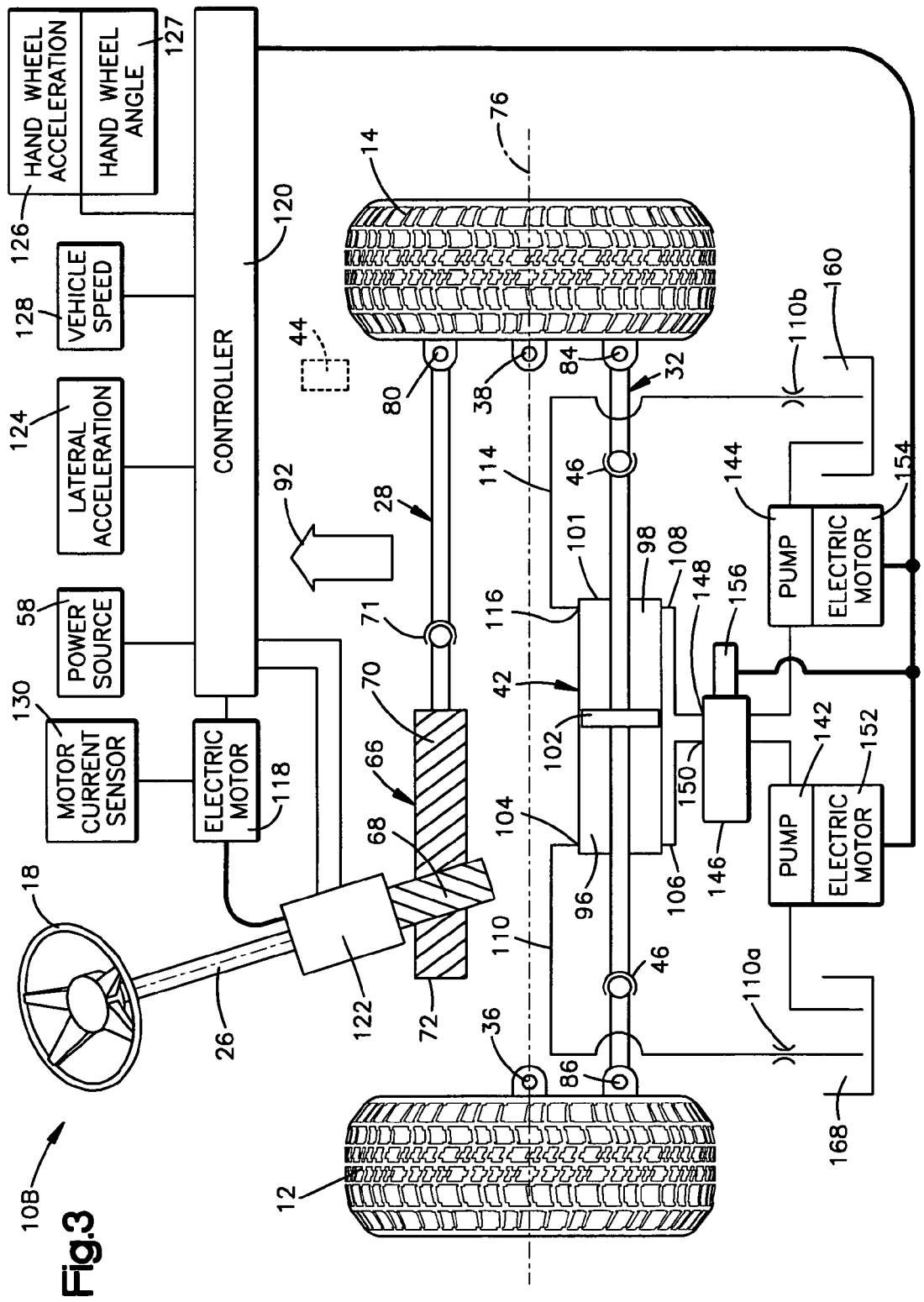
FIG. 3 is a schematic illustration of an apparatus constructed in accordance with a third embodiment of the present invention.

FIG. 3 illustrates an apparatus 10B constructed in accordance with a third embodiment of the present invention. Structures of FIG. 3 that are the same as or similar to structures of FIG. 1 are numbered using the same reference numbers and are not discussed in detail with regard to FIG. 3. Only the differences between the apparatus 10 of FIG. 1 and the apparatus 10B of FIG. 3 are discussed in detail below.

In the third embodiment, two small pumps 142, 144 are used together to generate the large force to turn the wheels. In particular, the two pumps 142, 144 are fluidly connected to a two position valve 146. A first output 148 of the valve is fluidly connected to a left chamber portion 96. A second output 150 of the valve is fluidly connected to the right chamber portion 98. The left pump 142, when actuated, draws hydraulic fluid from a reservoir 168, which is fluidly connected to the return line 110. The right pump 144, when actuated, draws hydraulic fluid from a reservoir 160, which is fluidly connected to return line 114.

The two position valve 146 operates to connect both of the pumps to either the left chamber portion 96 when the vehicle is turning left or the right chamber portion 98 when the vehicle is turning right. In particular, the electronic controller 120 is electrically connected to the motors 152, 154 of their respective pumps 142, 144. The electronic controller 120 is also electrically connected to a valve drive 156. The valve drive 156 is connected to the two position valve 146 for actuating the valve 148 between first and second positions. The valve drive 156 is preferably a solenoid. The controller 120 controls actuation of the valve drive 156 to place the valve 148 in either the first position or second position.

In operation, when a user starts to rotate the hand wheel 18 to turn the steerable wheels 12, 14 in the clockwise direction, the controller 120 analyzes the signal from the hand wheel angle sensor 126 and sends a first control signal to the valve drive 156, which positions the valve 146 in the first position. In the first position, the valve 146 places the pumps 142, 144 in fluid communication with the right chamber portion 98 of the power steering motor 42. The controller 120 also sends a control signal to the electric motor 118.

The controller 120 further sends a control signal. based on the signals received by the sensors 122, 124, 126, 127, and 128, to the motors 152, 154 of the pumps 142, 144 to supply a flow of hydraulic fluid to the right chamber 98. The amount of flow depends upon the sensed vehicle conditions as previously described in the first embodiment. The flow to the right chamber portion 98 increases the volume and pressure in the right chamber portion 98 and thereby moves the piston 102 to the left. This movement of the piston 102 causes the force transmitting member 32 to pivot about pivot connections 84, 86 and turns the wheels 12, 14 to the right. As the steerable wheels 12, 14 are turned to the right, the rack 66 moves toward the right in a follow-up manner and tends to return the sensors to a neutral position.

When the hand wheel 18 starts to rotate to turn the steerable wheels 12, 14 in the counterclockwise direction, the controller 120 analyzes the signal from the hand wheel angle sensor 126 and sends a second control signal to the valve drive 156, which positions the valve 146 in the second position. In the second position, the valve 146 places the pumps 142, 144 in fluid communication with the left chamber portion 96 of the power steering motor 42. The controller 120 also sends a control signal to the electric motor 118.

The controller 120 further sends a control signal based on the signals received by the sensors 122, 124, 126, 127, and 128, to the motors 152, 154 of the pumps 142, 144 to supply a flow of hydraulic fluid to the left chamber 96. The amount of flow depends upon the sensed vehicle conditions as previously described in the first embodiment. The flow to the left chamber portion 96 increases the volume and pressure in the left chamber portion 96 and thereby moves the piston 102 to the right. This movement of the piston 102 causes the force transmitting member 32 to pivot about pivot connections 84, 86 and turns the wheels 12, 14 to the left. As the steerable wheels 12, 14 are turned to the left, the rack 66 moves toward the left in a follow-up manner and tends to return the sensors to a neutral position. If the hydraulic motor 42 fails to operate, turning of the steerable wheels 12, 14 can be accomplished by manual rotation of the hand wheel 18.

From the above description of the invention, those skilled in the art will perceive improvements, changes and modifications. Such improvements, changes and modifications within the skill of the art are intended to be covered by the appended claims.

I claim:

1. An apparatus for turning steerable wheels of a vehicle in response to turning of a steering wheel of the vehicle, the apparatus comprising:
a first mechanism for connection to the steering wheel having a first member connected to a first pivot point of at least one of the steerable wheels, said first member being movable to turn the steerable wheels in response to turning of the steering wheel;
a second mechanism having a hydraulic power steering gear and a second member spaced from the first member and connected to a second pivot point of the at least one of the steerable wheels, said steering gear being free of a rotary valve responsive to a steering input generated by turning of the steering wheel, said steering gear including a first chamber for holding hydraulic fluid and a second chamber for holding hydraulic fluid, an increase in fluid pressure in one chamber acting to move the second member to turn the steerable wheels of the vehicle in one direction and an increase in fluid pressure in the other chamber acting to move the second member to turn the steerable wheels in a direction opposite the one direction; and
a variable flow mechanism for supplying a flow of hydraulic fluid to the first and second chambers of said hydraulic steering gear, that varies in dependence upon at least one sensed vehicle condition.

2. The apparatus of claim 1 wherein said variable flow mechanism is in fluid communication with said first chamber for supplying the flow of hydraulic fluid to said first chamber in response to the steerable wheels being turned in the one direction.

3. The apparatus of claim 1 wherein said variable flow mechanism comprises a pump driven by a variable speed electric motor.

4. The apparatus of claim 1 wherein said sensed vehicle condition is steering column torque.

5. The apparatus of claim 1 wherein the first member and the second member extend substantially parallel to one another.

6. The apparatus of claim 1 wherein the first mechanism includes a rack and pinion gear.

7. apparatus of claim 6 wherein the first member is connected to the rack and one of the steerable wheels.

8. The apparatus of claim 1 wherein the second member extends through the first and second chambers of the steering gear.

9. An apparatus for turning steerable wheels of a vehicle in response to turning of a steering wheel of the vehicle, the apparatus comprising:
an electric motor controlled by an electronic control module in response to at least one sensed vehicle condition for providing steering feel to the vehicle operator;
a hydraulic steering gear, said hydraulic steering gear including a first chamber for holding hydraulic fluid and a second chamber for holding hydraulic fluid, an increase in fluid pressure in one chamber acting to turn the steerable wheels of the vehicle in one direction and an increase in fluid pressure in the other chamber acting to turn the steerable wheels in a direction opposite the one direction;
a variable flow mechanism controllable by said electronic control module for supplying a variable flow of hydraulic fluid to the first and second chambers of said hydraulic steering gear, which flow varies in dependence upon the at least one sensed vehicle condition; and
a mechanism for connection to the steering wheel having a first member connected to a first pivot point of at least one of the steerable wheels, said first member being movable to turn the steerable wheels in response to turning of the steering wheel, a second member connected to a second pivot point of the at least one of the steerable wheels, said second member being movable in response to an increase in pressure in one of the first and second chambers to turn the steerable wheels.

10. The apparatus of claim 9 wherein said sensed vehicle condition is vehicle speed.

11. The apparatus of claim 10 including a vehicle speed sensor for sensing vehicle speed and for providing a vehicle speed signal, and wherein said electronic control module controlling said variable flow mechanism to supply a first flow of hydraulic fluid to the steering gear in response to said vehicle speed sensor sensing a first vehicle speed, said electronic control module controls said variable flow device to supply a second flow of hydraulic fluid to the steering gear that is higher than said first flow in response to said vehicle speed sensor detecting a second vehicle speed that is lower than said first speed.

12. The apparatus of claim 9 wherein said variable flow mechanism comprises a pump, driven by a variable speed electric motor.

13. The apparatus of claim 9 wherein said sensed vehicle condition is steering column torque.

14. The apparatus of claim 9 wherein said variable flow mechanism is in fluid communication with said first chamber for supplying the flow of hydraulic fluid to said first chamber to turn the steerable wheels in the one direction.

15. The apparatus of claim 14 wherein said variable flow mechanism includes two pumps and variable speed electric motors for driving said pumps, one of said pumps supplying the flow of hydraulic fluid to said first chamber, and other of said pumps supplying hydraulic fluid to said second chamber.

16. The apparatus of claim 9 further including at least one valve assembly fluidly connected to said first chamber, said second chamber, and said variable flow mechanism, said valve assembly having a first position to place said variable flow mechanism in fluid communication with said first chamber.

17. The apparatus of claim 16 wherein said valve assembly has a second position to place said variable flow mechanism in fluid communication with said second chamber.

18. The apparatus of claim 9 wherein said second member is spaced from said first member.

19. An apparatus for turning steerable wheels of a vehicle in response to turning of a steering wheel of the vehicle, the apparatus comprising:
an electric motor controlled by an electronic control module in response to at least one sensed vehicle condition for providing steering feel to the vehicle operator;
a hydraulic steering gear, said hydraulic steering gear including a first chamber for holding hydraulic fluid and a second chamber for holding hydraulic fluid, an increase in fluid pressure in one chamber acting to turn the steerable wheels of the vehicle in one direction and an increase in fluid pressure in the other chamber acting to turn the steerable wheels in a direction opposite the one direction; and
a variable flow mechanism controllable by said electronic control module for supplying a variable flow of hydraulic fluid to the first and second chambers of said hydraulic steering gear, which flow varies in dependence upon the at least one sensed vehicle condition, said variable flow mechanism including a first pump supplying the flow of hydraulic fluid to said first chamber and a first variable speed electric motor for driving said first pump, said variable flow mechanism including a second pump supplying the flow of hydraulic fluid to said second chamber and a second variable speed electric motor for driving said second pump.

20. The apparatus of claim 19 wherein said first variable speed motor is actuated to drive said first pump to supply the flow of hydraulic fluid to the first chamber in response to the steerable wheels being turned in the one direction, said second variable speed motor being actuated to drive said second pump to supply the flow of hydraulic fluid to the second chamber in response to the steerable wheels being turned in the direction opposite the one direction.

* * * * *

UNITED STATES PATENT AND TRADEMARK OFFICE
CERTIFICATE OF CORRECTION

PATENT NO. : 7,617,906 B2  
APPLICATION NO. : 11/250860  
DATED : November 17, 2009  
INVENTOR(S) : Daniel E. Williams Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 854 days.

Signed and Sealed this

Nineteenth Day of October, 2010

David J. Kappos  
*Director of the United States Patent and Trademark Office*